United States Patent
Healey

(10) Patent No.: US 10,530,906 B2
(45) Date of Patent: Jan. 7, 2020

(54) HIGH-SPEED INTERCONNECT SOLUTIONS WITH SUPPORT FOR CONTINUOUS TIME BACK CHANNEL COMMUNICATION

(71) Applicant: Avago Technologies International Sales Pte. Limited, Singapore (SG)

(72) Inventor: Adam Healey, Newburyport, MA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/797,424

(22) Filed: Oct. 30, 2017

(65) Prior Publication Data
US 2019/0020742 A1 Jan. 17, 2019

Related U.S. Application Data

(60) Provisional application No. 62/532,107, filed on Jul. 13, 2017.

(51) Int. Cl.
| | |
|---|---|
| *H04L 29/08* | (2006.01) |
| *H04B 3/04* | (2006.01) |
| *H04B 3/32* | (2006.01) |
| *H04L 25/03* | (2006.01) |
| *H04L 25/14* | (2006.01) |
| *H04L 1/00* | (2006.01) |

(52) U.S. Cl.
CPC .............. *H04L 69/324* (2013.01); *H04B 3/04* (2013.01); *H04B 3/32* (2013.01); *H04L 25/03019* (2013.01); *H04L 25/03343* (2013.01); *H04L 25/14* (2013.01); *H04L 1/0008* (2013.01); *H04L 25/03006* (2013.01); *H04L 69/323* (2013.01); *H04L 2001/0096* (2013.01); *H04L 2025/0377* (2013.01); *H04L 2025/03375* (2013.01); *H04L 2025/03815* (2013.01)

(58) Field of Classification Search
CPC ..................................................... H04L 69/324
See application file for complete search history.

(56) References Cited

U.S. PATENT DOCUMENTS

| 7,660,528 | B2 * | 2/2010 | Hirth | H04B 10/2537 |
| | | | | 398/72 |
| 7,925,269 | B2 * | 4/2011 | Shao | H04W 72/02 |
| | | | | 455/450 |
| 8,320,411 | B1 * | 11/2012 | Sedarat | H04W 52/365 |
| | | | | 370/241 |
| 8,989,254 | B2 * | 3/2015 | Jing | H04L 25/03878 |
| | | | | 375/233 |

(Continued)

*Primary Examiner* — Parth Patel
(74) *Attorney, Agent, or Firm* — Sterne, Kessler, Goldstein & Fox P.L.L.C.

(57) ABSTRACT

The present disclosure is directed to systems, apparatuses, and methods for performing continuous or periodic link training. Existing link training protocols generally perform link training only once during startup or initialization of a link and, as a result, are limited in their applications. After link training is performed and Open Systems Interconnect (OSI) data link layer and other high-layer data is transmitted across the link, no further link training is performed using these existing link training protocols. However, parameters of the link may change over time after link training is performed, such as temperature of the link and voltage levels of signals transmitted over the link by the transmitter of the transmitter-receiver pair.

20 Claims, 9 Drawing Sheets

(56) References Cited

U.S. PATENT DOCUMENTS

| | | | | |
|---|---|---|---|---|
| 9,178,692 | B1* | 11/2015 | Channabasappa | H04L 69/324 |
| 9,742,701 | B2* | 8/2017 | Woodruff | H04L 49/30 |
| 9,819,444 | B2* | 11/2017 | Shen | H04L 67/12 |
| 10,153,910 | B2* | 12/2018 | Tu | H04L 12/12 |
| 2005/0212564 | A1* | 9/2005 | Gabillard | G11C 27/026 |
| | | | | 327/94 |
| 2007/0032198 | A1* | 2/2007 | Sakamoto | H04L 29/06027 |
| | | | | 455/69 |
| 2009/0097390 | A1* | 4/2009 | Diab | H04L 12/40136 |
| | | | | 370/201 |
| 2009/0097393 | A1* | 4/2009 | Diab | H04B 3/32 |
| | | | | 370/201 |
| 2011/0206141 | A1* | 8/2011 | Barrett | H04L 5/1438 |
| | | | | 375/259 |
| 2012/0063295 | A1* | 3/2012 | Bliss | H04L 1/0001 |
| | | | | 370/216 |
| 2012/0300792 | A1* | 11/2012 | Patel | H04L 69/324 |
| | | | | 370/476 |
| 2013/0243011 | A1* | 9/2013 | Ungerboeck | H04L 12/403 |
| | | | | 370/464 |
| 2014/0010539 | A1* | 1/2014 | Varanese | H04J 3/1694 |
| | | | | 398/66 |
| 2014/0258813 | A1* | 9/2014 | Lusted | H04L 1/004 |
| | | | | 714/776 |
| 2016/0087750 | A1* | 3/2016 | Kang | H04L 27/2602 |
| | | | | 398/66 |
| 2017/0272308 | A1* | 9/2017 | Stone | H04L 47/10 |
| 2018/0227149 | A1* | 8/2018 | Johnson | H04L 25/03019 |
| 2019/0013919 | A1* | 1/2019 | Zhang | H04L 5/0053 |
| 2019/0020510 | A1* | 1/2019 | Valliappan | H04L 25/03019 |
| 2019/0020511 | A1* | 1/2019 | Pillai | H04L 25/03019 |
| 2019/0020602 | A1* | 1/2019 | Healey | H04L 49/351 |

\* cited by examiner

HIGH-SPEED INTERCONNECT SOLUTIONS WITH SUPPORT FOR CONTINUOUS TIME BACK CHANNEL COMMUNICATION

CROSS REFERENCE TO RELATED APPLICATIONS

This application claims the benefit of U.S. Provisional Application No. 62/532,107, filed Jul. 13, 2017, which is incorporated herein by reference in its entirety.

TECHNICAL FIELD

This application relates generally to high-speed interconnect solutions, including high-speed interconnect solutions for continuous time back channel communication and proprietary features.

BACKGROUND

Link training is a technique used in high speed serializer-deserializer (SerDes) communication and is part of the Ethernet Standard (e.g., Institute of Electrical and Electronics Engineers (IEEE) 802.3) specifications. Link training provides a protocol for a device to communicate over a point-to-point link, using in-band information, to a remote link partner (LP) to jointly improve the bit-error rate (BER) over the link and/or interference on adjacent channels caused by the link. Existing link training solutions perform link training only once, during startup or initialization of the link, because the mechanics of these solutions would interfere with user data. As a result, existing link training solutions are limited in their applications.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 1:
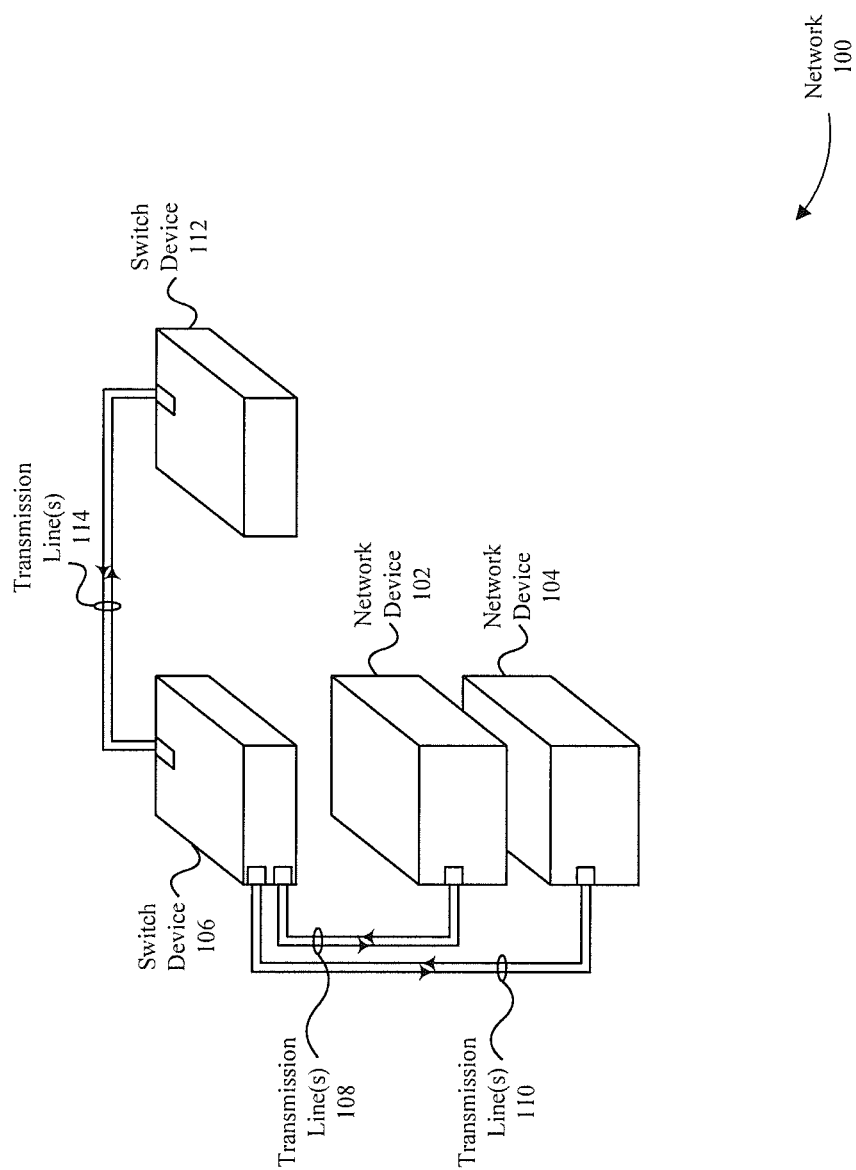
FIG. 1 illustrates an example network in which link training can be performed in accordance with embodiments of the present disclosure.

FIG. 1 is a high level diagram illustrating an example network 100 in which link training can be performed in accordance with embodiments of the present disclosure. Example network 100 may include various network devices 102 and 104, such as one or more servers, switches, routers, or hubs, and a switch device 106 to facilitate communication between the one or more network devices 102 and 104 and potentially other network devices of network 100 not shown.

Network devices 102 and 104 can be connected or otherwise in communication with each other through switch device 106, such as an Ethernet switch. For example, network devices 102 and 104 can each be coupled to a physical port of switch device 106 by respective network transmission line(s) 108 and 110. Network transmission line(s) 108 and 110 can be, for example, coaxial cables, twinax cables, twisted pair cables, fiber optic cables, backplane traces, or generally any other reasonable transmission line.

In one or more implementations, one or more of network devices 102 and 104 can be referred to as a remote link partner (LP) of switch device 106. In one or more implementations, a remote LP of switch device 106 can further include another switch device 112 coupled to switch device 106 via transmission line(s) 114. The type of transmission line(s) 114 can depend on the distance between switch devices 106 and 112. For example, transmission line(s) 114 can be provided using backplane traces (e.g., for short distances up to 1 m), twinax cables (e.g., for distances up to 15 m), twisted pairs (e.g., for distances up to 100 m), multimode fibers (e.g., for distances up to 5 km), and single-mode fibers (e.g., for distances up to 40 km).

Switch devices 106 and 112 and/or one or more of network devices 102 and 104 can implement link training. As discussed above, link training is a technique used in high speed serializer-deserializer (SerDes) communication and is part of the Ethernet Standard (e.g., IEEE 802.3) specifications. Link training provides a protocol for a network device to communicate over a point-to-point link, conventionally using in-band information (i.e., information transmitted in the same band that Open Systems Interconnect (OSI) data link layer and other high-layer data is transmitted), to a remote LP to jointly improve the bit-error rate (BER) of the link and/or interference to adjacent channels caused by the link. In yet another example, link training can be performed by the transmitter-receiver pair to perform some sort of maintenance task to maintain the link.

More specifically, in one or more implementations, link training can be performed between a transmitter of one device in network 100 and a receiver of another device in network 100 (i.e., a transmitter-receiver pair) that are coupled together via one or more transmission lines. Link training can be performed by the transmitter-receiver pair to tune or adapt one or more settings of the transmitter to improve, for example, the bit-error rate (BER) of a communication channel (i.e., a link) established between the transmitter-receiver pair over the one or more transmission lines that couple the transmitter-receiver pair together. In addition or alternatively, link training can be performed by the transmitter-receiver pair to tune or adapt one or more settings of the transmitter to improve interference caused by the link established between the transmitter-receiver pair in other, nearby transmission lines or adjacent channels. In yet another example, link training can be performed by the transmitter-receiver pair to perform some sort of maintenance task to maintain the link.

Existing link training protocols generally perform link training only once during startup or initialization of the link and, as a result, are limited in their applications. After link training is performed and OSI data link layer and other high-layer data is transmitted across the link, no further link training is performed using these existing link training protocols because of their mechanics and how they would interfere with the user data. However, parameters of the link may change over time after link training is performed, such as temperature of the link and voltage levels of signals transmitted over the link by the transmitter of the transmitter-receiver pair.

Continuous or periodic link training can therefore be beneficial in some circumstances, especially for higher-speed serial communication links, such as those at or above 100 gigabits per second (Gb/s). During continuous or periodic link training, link training data can be transmitted using in-band and/or out-of-band information that is intermixed with OSI data link layer and other high-layer data (i.e., user data).

In one or more implementations, switch device 112 can be placed close enough to a connector or port of switch device 106 and therefore the interconnect length may be reduced. In order to extend the reach of transmission line(s) 114, an intermediate device or component, such as a simplex or duplex retimer, may be inserted near the connector or port of either or both of switch device 112 and switch device 106 to extend the reach of transmission line(s) 114. In one or more implementations, a simplex retimer can be a device and/or component that is a unidirectional repeater used to extend the length of a link, whereas a duplex retimer may be two simplex retimers that operate together to form a bi-directional repeater used to extend the length of a link in both communication directions. In one or more implementations, only one direction of the link at a device may use a simplex retimer, but not the other direction of the link at the device. In one or more implementations, the simplex retimers can be physical layer aware, e.g. the retimer may operate on the physical layer, such as one of the physical layers specified by the IEEE 802.3 Standard specifications.

Figure 2:
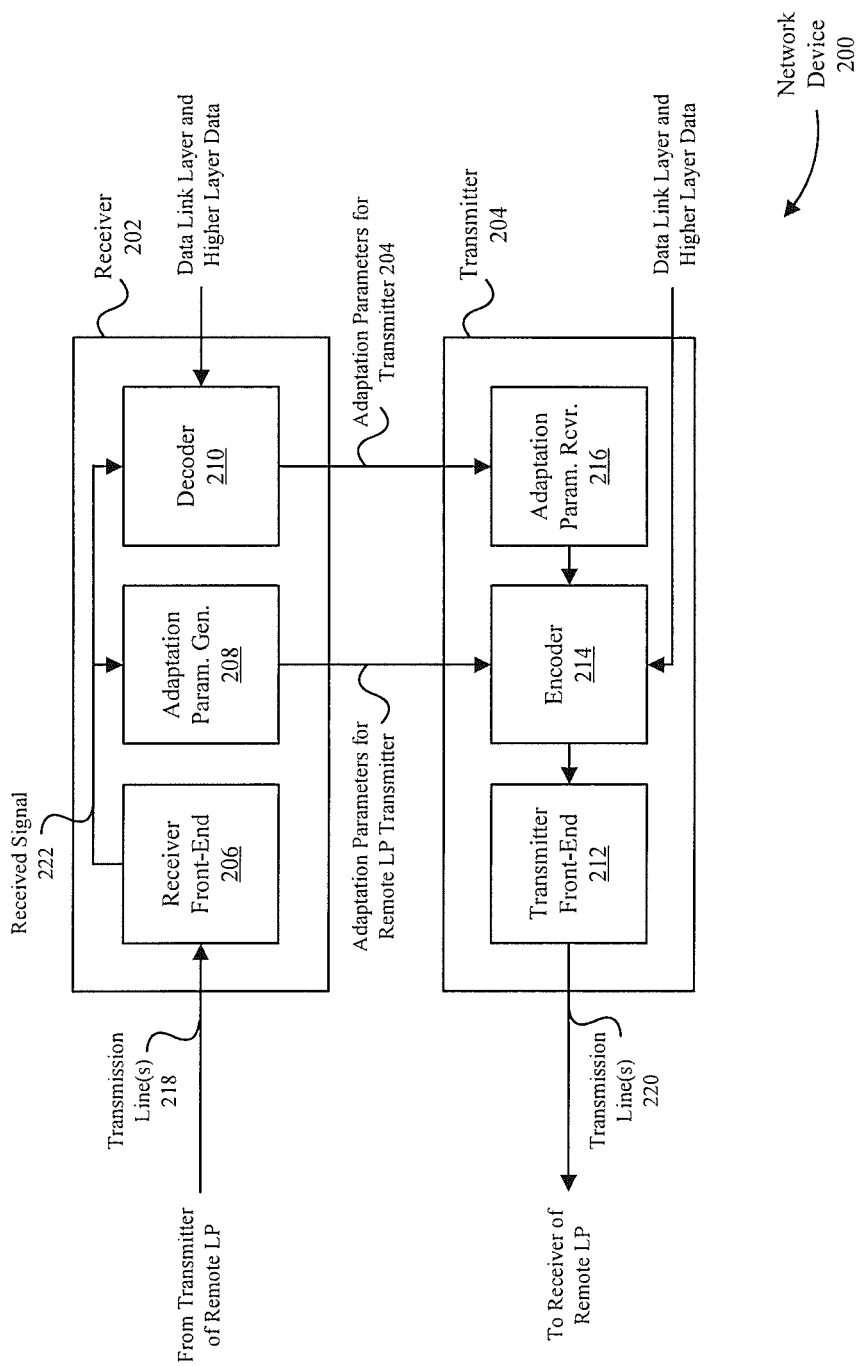
FIG. 2 illustrates a block diagram of a network device with continuous and/or periodic link training capability in accordance with embodiments of the present disclosure.

FIG. 2 illustrates a block diagram of a network device 200 with continuous and/or periodic link training capability in accordance with embodiments of the present disclosure. Examples of network device 200 include a switch device, such as switch device 106 in FIG. 1, or another network device, such as one of network devices 102 or 104 in FIG. 1. In one or more implementations, network device 200 is compliant with one or more of the IEEE 802.3 Standard specifications and forms one side of an Ethernet link.

As shown in FIG. 2, network device 200 includes a receiver 202 and a transmitter 204. Receiver 202 includes a receiver front-end 206, an adaptation parameter generator 208, and a decoder 210. Transmitter 204 includes a transmitter front-end 212, an encoder 214, and an adaptation parameter receiver 216. Receiver 202 and transmitter 204 together form a transceiver that performs high speed SerDes communication with a remote LP (not shown) over transmission line(s) 218 and 220. The remote LP can be, for example, a switch, router, server, or another type of network device.

Network device 200 includes features that allow link training, as described above, to be performed with the remote LP over transmission line(s) 218 and 220. For example, when transmitter 204 is communicating with a receiver (not shown) of the remote LP over transmission line(s) 220, the receiver of the remote LP can request transmitter 204 to change one or more of its operating parameters (e.g., its feed-forward equalizer tap weights and/or precoder settings). This request can be made to improve, for example, BER performance of the link between the transmitter-receiver pair established over transmission line(s) 220. The receiver of the remote LP makes the request because transmitter 204 may not be aware of channel characteristics and/or variations that change over time during operation, such as temperature and signal voltage levels, of the link between the transmitter-receiver pair. The request from the receiver of the remote LP can therefore be used to enhance the quality of the link to improve BER performance and other measures of link performance.

In some implementations, receiver front-end 206 can recover a signal 222 received over transmission line(s) 218 from the transmitter (not shown) of the remote LP and provide the received signal 222 in the digital domain to adaptation parameter generator 208 and decoder 210. Before providing the received signal 222 in the digital domain to adaptation parameter generator 208 and decoder 210, receiver front-end 206 can perform filtering, amplification, shaping, and/or equalization on the signal in either the analog or digital domain. Decoder 210 can decode the received signal 220 from receiver front-end 206 and extract from the received signal 220 data that is sent over a link training communication channel that co-exists with data traffic corresponding to the OSI data link layer and other higher OSI layers. The data extracted from the link training communication channel can include the request from the receiver of the remote LP to change one or more of the operating parameters (e.g., feed-forward equalizer tap weights or precoder settings) of transmitter 204.

In contrast to prior link training solutions, the link training communication channel can persist after initialization of the link between the transmitter-receiver pair is established over transmission line 218 to allow for continuous or periodic updates to operating parameters of transmitter 204.

Decoder 210 can pass the extracted data (or adaptation parameters) from the link training communication channel to adaptation parameter receiver 216 of transmitter 204. Adaptation parameter receiver 216 can then set or adjust one or more parameters of encoder 214 and/or transmitter front-end 212 based on the extracted data received from decoder 210. For example, adaptation parameter receiver 216 can adjust tap weights of a feed-forward equalizer used by encoder 214 to equalize data transmitted over transmission line(s) 220 and/or weights of a precoder used to precode data transmitted over transmission line(s) 220. In another example, where transmission line(s) 220 include a differential pair of transmission lines, adaptation parameter receiver 216 can adjust the delay in one or both lines of the differential pair to compensate for any differential skew at the receiver of the remote LP based on the extracted data. In one embodiment, because the link training communication channel persists after initialization of the link between the transmitter-receiver pair is established over transmission line(s) 218, a long feed-forward equalizer with, for example, ten or more taps can be used to improve performance and/or a sparse feed-forward equalizer for reflection cancellation can be implemented.

In the opposite communication direction, when receiver 202 is communicating with the transmitter of the remote LP over transmission line(s) 218, receiver 202 can request the transmitter of the remote LP to change one or more of its operating parameters (e.g., its feed-forward equalizer tap weights, precoder settings, or differential pair delay parameters to compensate for differential skew). This request can be made to improve, for example, a BER performance of the link between the transmitter-receiver pair established over transmission line(s) 218. Receiver 202 makes the request because the transmitter of the remote LP may not be aware of channel characteristics and/or variations that change over time during operation, such as temperature and signal voltage levels, of the link between the transmitter-receiver pair. The request from receiver 202 can therefore be used to enhance the quality of the link to improve the BER performance and other measures of link performance.

In some implementations, adaptation parameter generator 208 monitors the quality of received signal 222 using one more known quality measurement techniques or algorithms and determines the changes to the one or more parameters of the transmitter of the remote LP to improve the performance of the link between the transmitter-receiver pair established over transmission line(s) 218. Adaptation parameter generator 208 then sends the changes to the one or more parameters (or adaptation parameters) as part of the request to encoder 214 for transmission to the remote LP. Encoder 214 can encode the request and transmit the encoded request over the link training communication channel, which co-exists with data traffic corresponding to the OSI data link layer and other higher OSI layers.

In one implementation, the link training communication channel is formed by "stealing" overhead from a Physical Coding Sublayer (PCS). The PCS is part of the OSI networking protocol sublayer in, for example, the Fast Ethernet and Gigabit Ethernet standards. It sits at the top of the physical layer (PHY) and performs data encoding/decoding (e.g., 64/66 bit encoding/decoding), scrambling/descrambling, alignment marker insertion/removal, etc. Decoder 210 can implement the decoding, decscrambling, and/or alignment marker removal functionality of the PCS, whereas encoder 214 can implement the encoding, scrambling, and alignment marker insertion functionality of the PCS.

The PCS inserts and removes alignment markers to allow, among other things, PCS encoded blocks of data (e.g., 66 bit encoded blocks of data) to be aligned after being received over one or more transmission lines. The alignment markers include pad bits in many networking specifications, such as the IEEE 802.3 Standard specifications. These pad bits in the alignment markers that carry no information can be reassigned (or "stolen") by the encoder of the remote LP's transmitter and encoder 214 of transmitter 204 to form the link training communication channel for carrying respective link training data. The remote LP's receiver and decoder 210 of receiver 202 can then extract the pad bits to recover the link training data.

For example, IEEE 802.3 clause 134 RS-FEC includes a 1-bit pad, in mapped alignment markers, that occurs every 1024 encoded blocks of data or codewords that can be reassigned to form the link training communication channel for carrying link training data bits. IEEE 802.3 clause 92 RS-FEC includes a 5-bit pad, in mapped alignment markers, that occurs every 4096 encoded blocks of data or codewords that can be reassigned to form the link training communication channel for carrying link training data bits. IEEE 802.3 clause 119 includes a 65-bit pad, in mapped alignment markers, that occurs every 8193 encoded blocks of data or codewords for 200 Gb/s Ethernet that can be reassigned to form the link training communication channel for carrying link training data bits. Finally, IEEE 802.3 clause 119 includes a 113-bit pad, in mapped alignment markers, that occurs every 4096 encoded blocks of data or codewords for 400 Gb/s Ethernet that can be reassigned to form the link training communication channel for carrying link training data bits.

In another implementation, the link training communication channel can be formed by adding low-frequency signaling on "top" of the comparatively higher-frequency signaling used to transmit OSI data link layer and other high-layer data over transmission line(s) 218 and 220. For example, FIG. 3 illustrates one implementation of transmitter 204 in FIG. 2 that is configured to add low-frequency signaling that forms the link training communication channel on top of the higher-frequency signaling used to transmit OSI data link layer and other high-layer data in accordance with an embodiment of the present disclosure.

Figure 3:
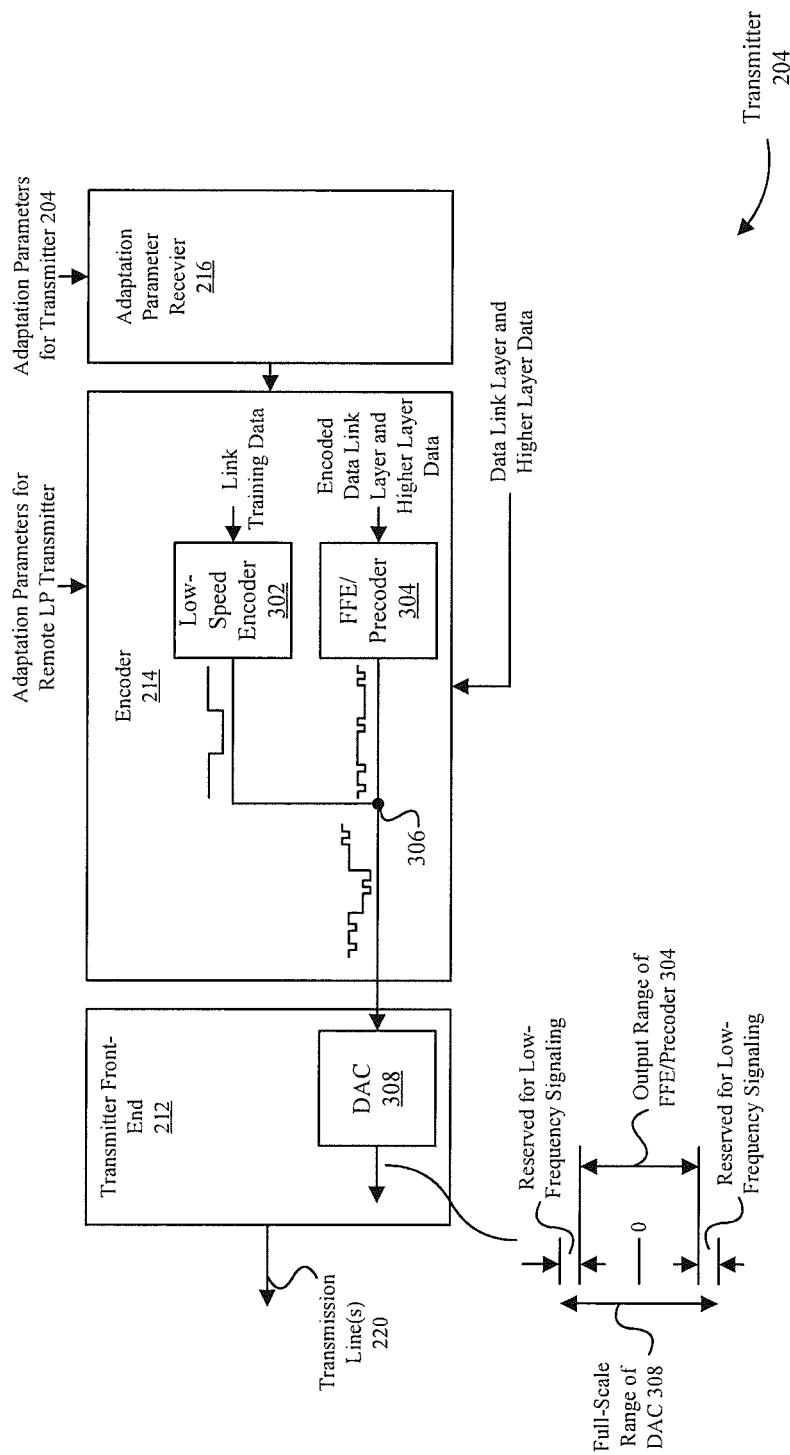
FIG. 3 illustrates one implementation of transmitter that is configured to add low-frequency signaling that forms a link training communication channel on top of higher-frequency signaling used to transmit Open Systems Interconnect (OSI) data link layer and other high-layer data in accordance with an embodiment of the present disclosure.

More specifically, as shown in FIG. 3, encoder 214 includes a low-speed encoder 302 and, for example, a feed-forward equalizer (FFE)/precoder 304. Low-speed encoder 302 receives link training data from, for example, adaptation parameter generator 208 of receiver 202 as described above in FIG. 2 and encodes the link training data for transmission over transmission line(s) 220. Low-speed encoder 302 can encode the link training data at a bit or symbol rate that is much slower than the bit or symbol rate of the encoded OSI data link layer and higher layer data processed by FFE/precoder 304. For example, low-speed encoder 302 can encode the link training data into bits or symbols that each span R bits or symbols of the encoded OSI data link layer and higher layer data, where R is an integer. In one embodiment, R is greater than 1000. However, an upper bound on R may be set based on any AC coupling performed on the encoded link training data at the receiver of the remote LP or in association with transmission line(s) 220. In addition, low-speed encoder 302 can encode the link training data using, for example, a Manchester encoding or a differential Manchester encoding.

When used, FFE/precoder 304 is configured to precode and/or equalize the encoded OSI data link layer and higher layer data. The actual hardware and/or software used to encode the OSI data link layer and higher layer data is not shown in encoder 214 for clarity purposes.

The low-speed encoded data output by low-speed encoder 302 and the equalized and/or precoded OSI data link layer and higher layer data output by FFE/precoder 304 are combined at summing node 306 and passed onto transmitter front-end 212. Transmitter front-end 212 includes a digital-to-analog converter (DAC) 308 that converts the combined encoded data from the digital domain to the analog domain. In another embodiment, the two signals are first converted to the analog domain and then combined. In one embodiment, part of the full-scale output range of DAC 308 is reserved for the low-frequency signal carrying the link training data as shown in the bottom left of FIG. 3. The signal swing of the low-frequency signal carrying the link training data can be kept low to avoid sacrificing too much dynamic range of DAC 308.

It should be noted that the link training data, before being processed by low-speed encoder 302, can be encoded by a forward-error correcting code. Encoding the link training data with a forward-error correcting code can help to facilitate the use of a lower amplitude signal, with less noise-margin, output by low-speed encoder 302. It should be further noted that the low-frequency signal carrying the link training data can be sent as common mode over transmission line(s) 220 when transmission line(s) 220 form a differential pair. More specifically, the OSI data link layer and higher layer data can be sent over transmission line(s) 220 as a differential signal and the low-frequency signal carrying the link training data can be sent over transmission line(s) 220 as common mode to further prevent interference between the two signals.

Figure 4:
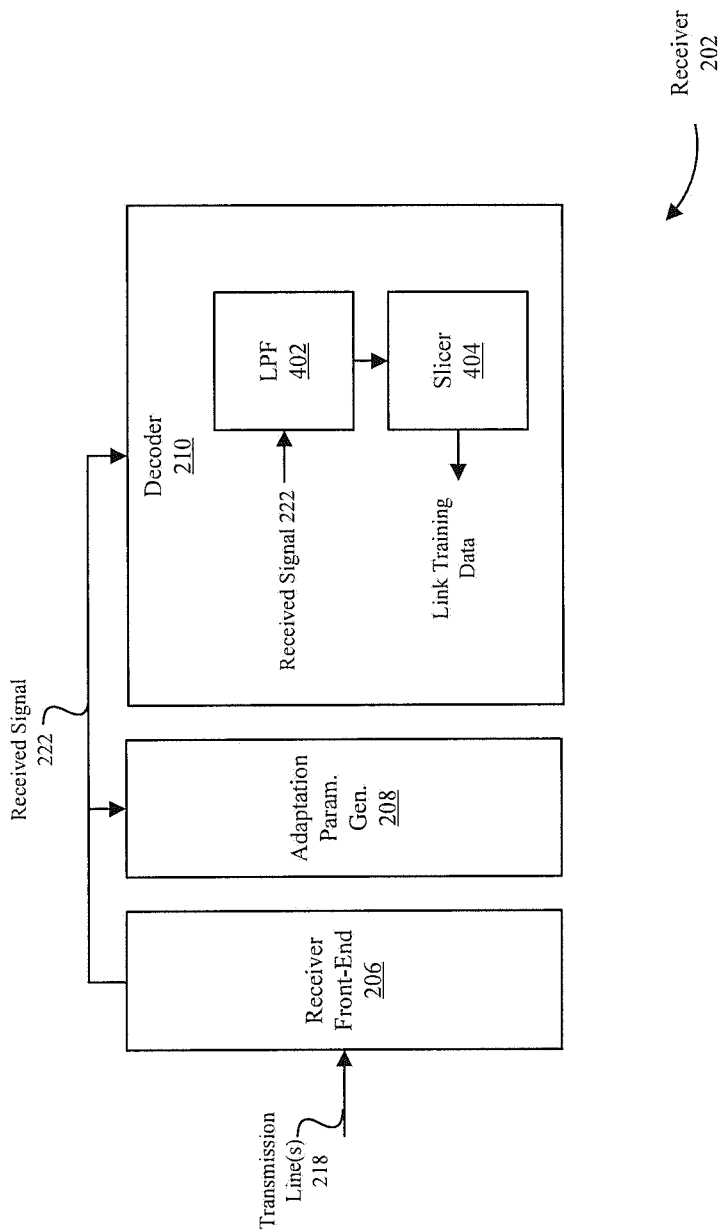
FIG. 4 illustrates one implementation of receiver that is configured to extract low-frequency signaling that forms a link training communication channel on top of higher-frequency signaling used to transmit OSI data link layer and other high-layer data in accordance with an embodiment of the present disclosure.

FIG. 4 illustrates one implementation of receiver 202 in FIG. 2 that is configured to extract the low-frequency signaling that forms the link training communication channel on top of the higher-frequency signaling used to transmit OSI data link layer and other high-layer data in accordance with an embodiment of the present disclosure. As shown in FIG. 4, decoder 210 includes a low-pass filter (LPF) 402 and a slicer 404. LPF 402 is configured to low-pass filter received signal 222. The output of LPF 402 is a low-frequency signal carrying link training data as discussed above.

Slicer 404 is configured to sample the low-frequency signal that is output by LPF 402 at the rate in which symbols of the link training data were encoded. Slicer 404 is then configured to determine whether the sample is above or below a predefined threshold. For example, if zero volts is the threshold used by slicer 404 to decide whether a sample of the low-frequency signal is either a logical one or a logical zero value, then any sample that has a voltage below the zero volt threshold will be determined to be a logical zero value by slicer 404 and any sample that has a voltage above the zero volt threshold will be determined to be a logical one value by slicer 404. Slicer 404 outputs a logical one value or logical zero value for each received symbol based on its determination. The output of slicer 404 (ideally) represents the original link training data transmitted over the link training communication channel. It should be noted that in other instances, where the link training data is encoded using more than two amplitude levels (e.g., PAM-4), slicer 404 can include additional slicer levels than the two mentioned above. It should also be noted that after slicer 404 outputs the link training data, further forward error correction decoding can be performed on the link training data to detect and, potentially, correct for any errors in the data.

Up until this point in the description, the described link training communication channels have all been "co-propagating" link training communication channels, where co-propagating refers to the fact that the link training data is transmitted in the same direction as the user data (i.e., in the same direction as the OSI data link layer and other high-layer data) over the transmission line(s). A "counter-propagating" link training communication channel can further be implemented and can be particularly valuable in closing a link training feedback loop in a system with one transmission line or set of transmission lines for communicating data between two devices in a single direction.

Figure 5:
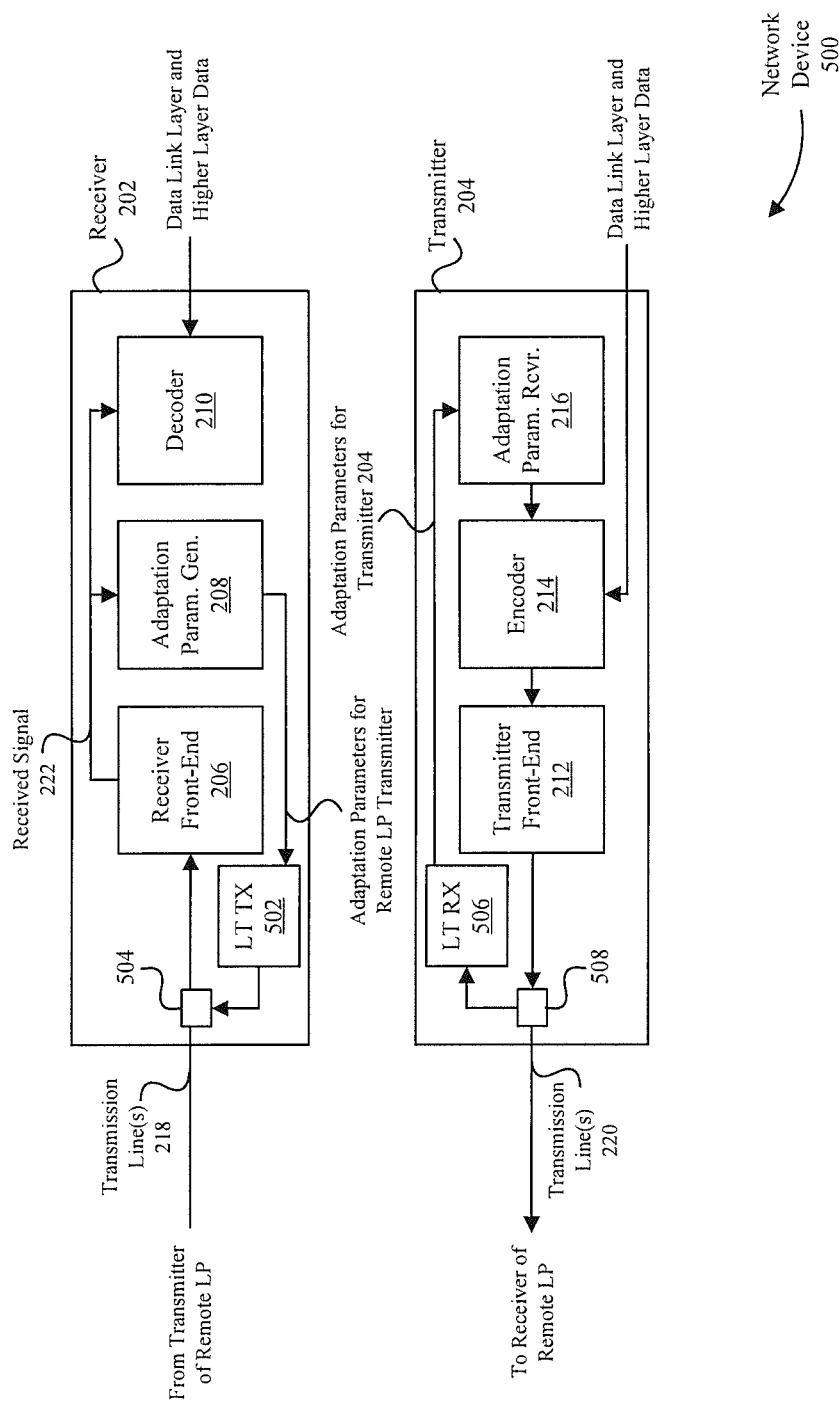
FIG. 5 illustrates one implementation of a transmitter and receiver that are configured to form a link training communication channel using frequency-division duplexing in accordance with embodiments of the present disclosure.

In particular, such a link training communication channel can be formed using frequency-division duplexing over one or more of transmission line(s) 218 and 220. For example, as shown in network device 500 of FIG. 5, receiver 202 can have a link training (LT) transmitter (TX) 502 to transmit a request from receiver 202 with the adjustment parameters for the remote LP transmitter as generated by adaptation parameter generator 208. LT TX 502 can transmit the request over the same transmission line(s) 218 that receiver 202 receives signal 222 from the transmitter of the remote LP. More specifically, LT TX 502 can transmit the request in a different frequency band than the frequency band used by the transmitter of the remote LP to transmit signal 222. A hybrid 504 could also be used to prevent the transmit signal of LT TX 502 from interfering with the operation of receiver front-end 206. The transmitter of the remote LP can further include a link training (LT) receiver (RX) and hybrid to receive the request from receiver 202.

An example of such an LT RX is shown in transmitter 204 as LT RX 506. Transmitter 204 can implement a similar FDD scheme with the receiver of the remote LP. LT RX 506 can be coupled to transmission line(s) 220 using a hybrid 508 to prevent the transmit signal of transmitter front-end 212 from interfering with the operation of LT RX 506.

It should again be noted that the signal carrying the link training data can be sent as common mode over transmission line(s) 218 or 220 when transmission line(s) 218 or 220 form a differential pair. More specifically, the OSI data link layer and higher layer data can be sent over transmission line(s) 218 and 220 as a differential signal and the signal carrying the link training data can be sent over transmission line(s) 218 or 220 as common mode to further prevent interference between the two signals. It should be further noted that the co-propagation and counter-propagation link training communication channels can be used together to form a closed loop training channel over a single transmission line or set of transmission lines used in a differential signaling scheme.

As discussed above, in some implementations of network devices, such as those shown in FIG. 1, a simplex or duplex retimer can be used to extend the reach of transmission line(s) used by the network device to communicate with a remote LP. In one or more implementations, a simplex retimer can be a unidirectional repeater used to extend the length of transmission line(s), whereas a duplex retimer may be two simplex retimers that operate together to form a bi-directional repeater used to extend the length of transmission line(s) in both communication directions. In one or more implementations, only one direction of a link at a device may use a simplex retimer, but not the other direction of the link at the device. In one or more implementations, the simplex retimers can be physical layer aware, e.g. the retimer may operate on the physical layer, such as one of the physical layers specified by the IEEE 802.3 specifications.

Figure 6:
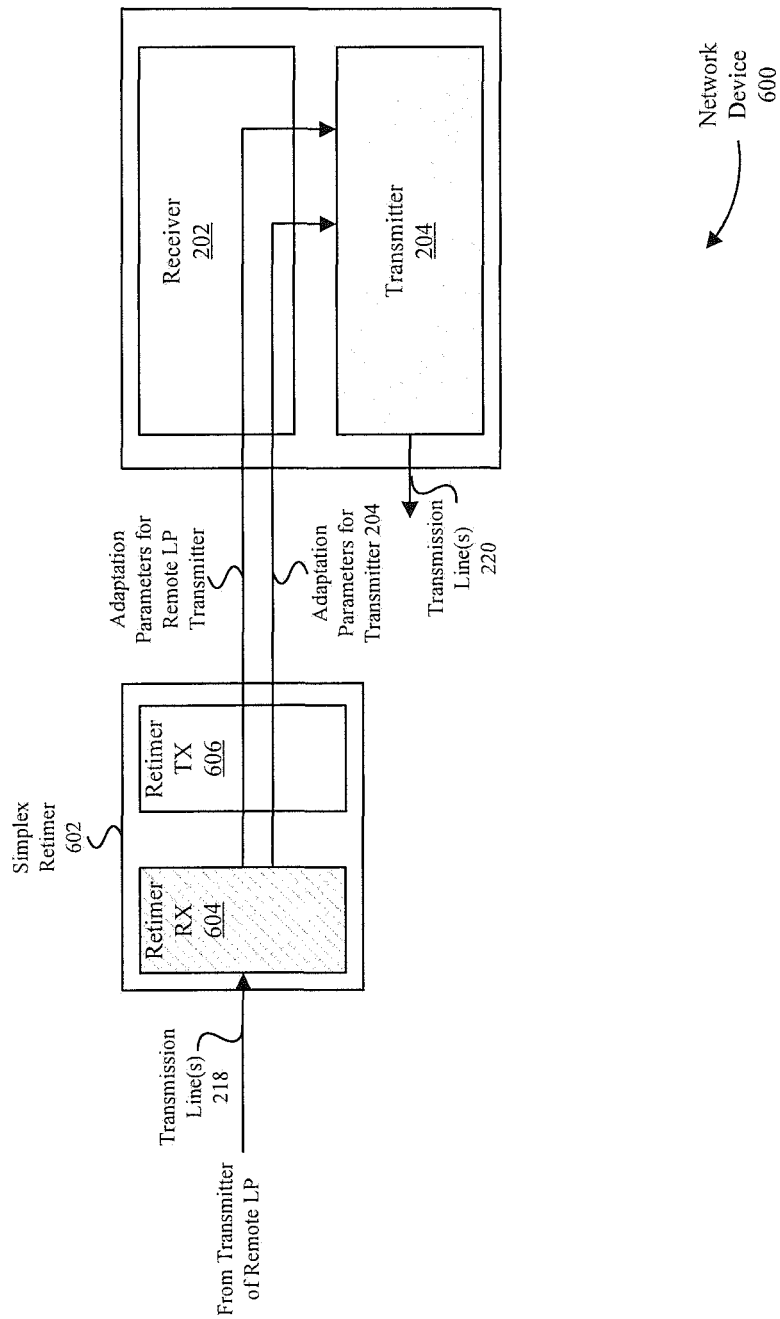
FIG. 6 illustrates an example network device with a receiver and a transmitter as well as a simplex retimer that are configured to perform link-training in accordance with embodiments of the present disclosure.

FIG. 6 illustrates an example network device 600 with receiver 202 and transmitter 204 as discussed above with respect to FIG. 2 as well as a simplex retimer 602 that are configured to perform link-training in accordance with embodiments of the present disclosure. In one embodiment, receiver 202 and transmitter 204 are implemented on chip with the hardware and software configured to perform the main functionality of network device 600 (e.g., switching functionality, server functionality, etc.). In this embodiment, simplex retimer 602 is implemented on a separate chip but still within network device 600. For example, simplex retimer 602 can be implemented on the same printed circuit board as the chip that implements receiver 202 and transmitter 204. The two chips can be coupled via copper traces on the printed circuit board or some other type of transmission line(s) not shown in FIG. 6.

Simplex retimer 602 is configured to clean up and remove signal degradation of a signal received over transmission line(s) 218 from the transmitter of the remote LP (not shown) before sending the signal to receiver 202. As shown in FIG. 6, simplex retimer 602 specifically includes a retimer receiver (RX) 604 and a retimer transmitter (TX) 606. Retimer receiver 604 is configured to receive the signal from the transmitter of the remote LP over transmission line(s) 218 and remove, at least to some extent, degradation of the signal. In some implementations, retimer RX 604 includes an adaptive continuous time linear equalizer and/or a decision feedback equalizer for cleaning up and removing signal degradation of a signal received over transmission line(s) 218 from the transmitter of the remote LP before sending the signal to receiver 202. Although not shown in FIG. 6, after cleaning up the signal received over transmission line(s) 218, retimer RX 604 can pass the signal to retimer TX 606 to transmit the signal to receiver 202 for processing as described above with respect to FIG. 2.

In addition, because receiver 202 is not in direct communication with the transmitter of the remote LP as was the case in FIG. 2, retimer RX 604 can now perform link training as described above with the transmitter of the remote LP. In particular, retimer RX 604 can include an adaptation parameter generator similar to adaptation parameter generator 208 and a decoder similar to decoder 210. Retimer RX 604 can then pass on the adaptation parameters that it generated by analyzing the signal received from the transmitter of the remote LP partner using one or more known quality measurement techniques or algorithms, as well as those adaptation parameters received directly from the remote LP transmitter to adjust parameters of transmitter 204 as described above. Retimer RX 604 can receive the parameters from the transmitter of the remote LP in the same manner as receiver 202 over an communication link formed using any of the above methods or techniques described above (e.g., stealing bits from the PCS protocol, low-speed signaling, etc.). Retimer TX 606 and receiver 202 act as "pass through" devices, as shown in FIG. 6, to pass these sets of adaptation parameters to transmitter 204.

Figure 7:
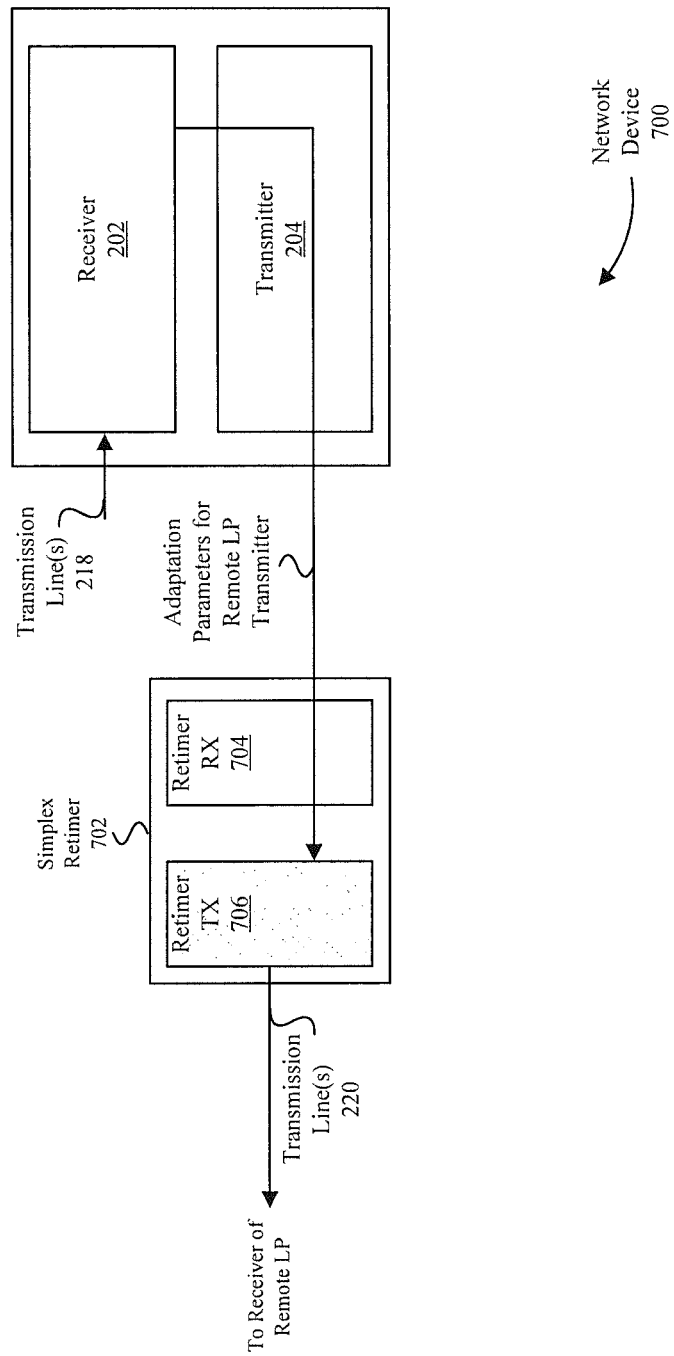
FIG. 7 illustrates another example network device with a receiver and a transmitter as well as a simplex retimer that are configured to perform link-training in accordance with embodiments of the present disclosure.

Referring now to FIG. 7, another network device 700 is illustrated that includes receiver 202 and transmitter 204 as discussed above with respect to FIG. 2 as well as a simplex retimer 702 that are configured to perform link-training in accordance with embodiments of the present disclosure. In one embodiment, receiver 202 and transmitter 204 are implemented on chip with the hardware and software configured to perform the main functionality of network device 700 (e.g., switching functionality, server functionality, etc.). In this embodiment, simplex retimer 702 is implemented on a separate chip but still within network device 700. For example, simplex retimer 702 can be implemented on the same printed circuit board as the chip that implements receiver 202 and transmitter 204. The two chips can be coupled via copper traces on the printed circuit board or some other type of transmission line(s) not shown in FIG. 7.

Simplex retimer 702 is configured to clean up and remove signal degradation of a signal received over transmission line(s) 220 from transmitter 204 before sending the signal to the receiver of the remote LP (not shown) over transmission line(s) 220.

As shown in FIG. 7, simplex retimer 702 specifically includes a retimer receiver (RX) 704 and a retimer transmitter (TX) 606. Retimer RX 704 is configured to receive a signal from transmitter 204 carrying OSI data link layer and higher layer data and remove, at least to some extent, signal degradation of the signal. In some implementations, retimer RX 704 includes an adaptive continuous time linear equalizer and/or a decision feedback equalizer for cleaning up and removing signal degradation of a signal received from transmitter 704 before sending the signal to retimer TX 706 for transmission to the receiver of the remote LP over transmission line(s) 220.

Because transmitter 204 is not in direct communication with the receiver of the remote LP as was the case in FIG. 2, retimer TX 706 can now perform link training with the transmitter of the remote LP as described above with respect to FIG. 2. In particular, retimer TX 706 can include an encoder similar to encoder 214 in FIG. 2 to encode any adaptation parameters for the transmitter of the remote LP over an communication link formed using any of the above methods or techniques described above (e.g., stealing bits from the PCS protocol, low-speed signaling, etc.). The adaptation parameters for the receiver of the remote LP are generated by receiver 202 as described above with respect to FIG. 2. Transmitter 204 and retimer RX 704 can act as "pass through" devices, as shown in FIG. 7, to pass this set of adaptation parameters to retimer TX 706.

Figure 8:
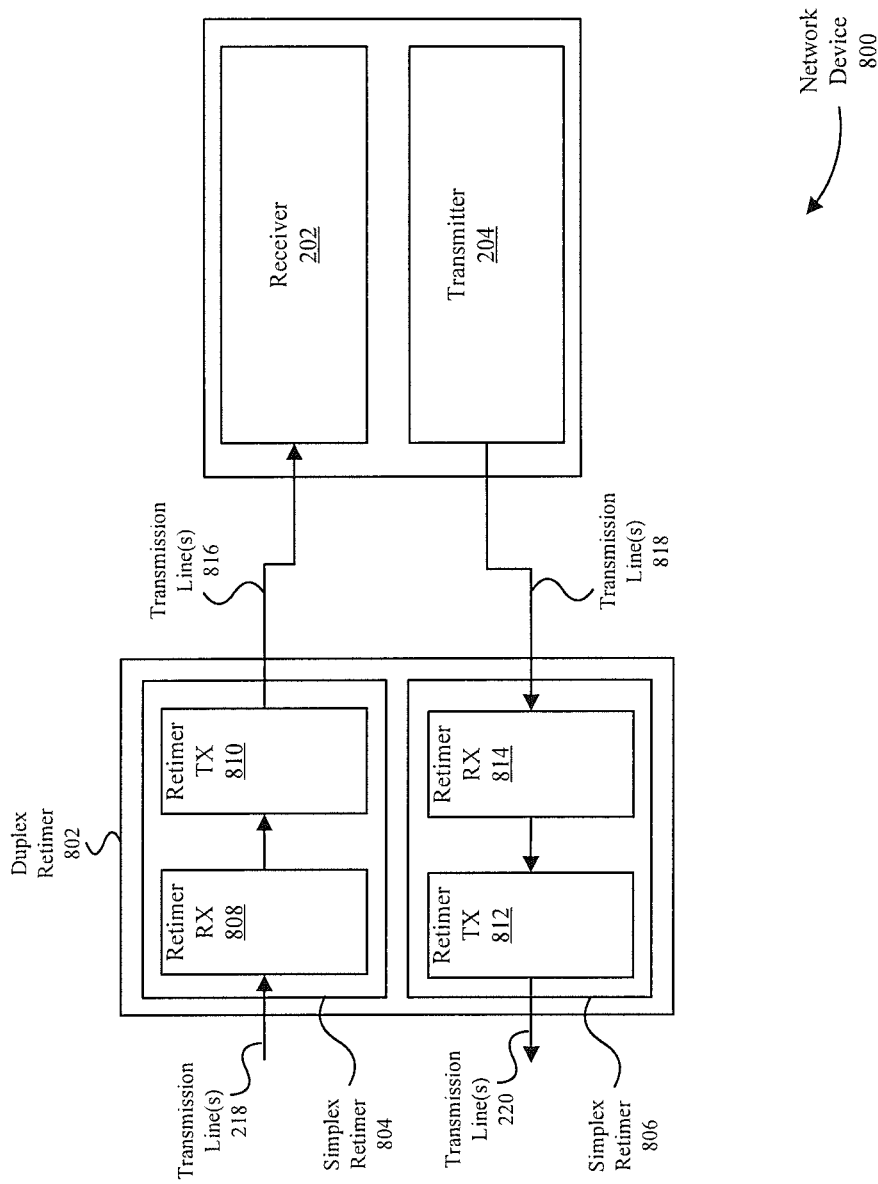
FIG. 8 illustrates an example network device with a receiver and a transmitter as well as a duplex retimer that are configured to perform link-training in accordance with embodiments of the present disclosure.

Referring now to FIG. 8, another network device 800 is illustrated with receiver 202 and transmitter 204 from FIG. 2 as well as a duplex retimer 802 configured to perform link-training in accordance with embodiments of the present disclosure. Duplex retimer 802 includes two simplex retimers 804 and 806. Simplex retimer 804 includes a retimer receiver (RX) 808 and a retimer transmitter (TX) 810. Simplex retimer 806 includes a retimer RX 812 and a retimer TX 812. In one embodiment, receiver 202 and transmitter 204 are implemented on chip with the hardware and software configured to perform the main functionality of network device 800 (e.g., switching functionality, server functionality, etc.). In this embodiment, duplex retimer 802 is implemented on a separate chip but still within network device 800. For example, duplex retimer 802 can be implemented on the same printed circuit board as the chip that implements receiver 202 and transmitter 204. The two chips can be coupled via copper traces on the printed circuit board or some other type of transmission line(s) not shown in FIG. 8.

In one embodiment, receiver 202 and transmitter 204 can perform link training with duplex retimer 802 as described above with respect to FIG. 2. More specifically, in such an embodiment, duplex retimer 802 can be considered the remote LP of receiver 202 and transmitter 204 as described above with respect to FIG. 2. Receiver 202 and transmitter 204 can perform link training with duplex retimer 802 by transmitting and receiving link training data over a link training communication channel co-exists with data traffic corresponding to the OSI data link layer and other higher OSI layers that is communicated over transmission line(s) 816 and 818. The link training communication channel can be formed using one or more of the techniques discussed above. For example, the link training communication channel can be formed by stealing pad bits from the alignment markers of the PCS protocol or using low-frequency signaling that is positioned on "top" of the comparatively higher-frequency signaling used to carry the OSI data link layer and other higher OSI layers.

In one embodiment, the link training communication channel can be used to carry link training data as described above between duplex retimer 802 and receiver 202 and transmitter 204. In another embodiment, the link training communication channel can further be used to carry link training data to signal proprietary modes that each of duplex retimer 802 and receiver 202 and transmitter 204 support. For example, proprietary modes can include proprietary speeds for communicating the OSI data link layer and other higher OSI layers over transmission line(s) 816 and 818, proprietary PCS protocol alignment markers for communicating the OSI data link layer and other higher OSI layers over transmission line(s) 816 and 818, and proprietary forward error correction schemes that can be used to encode the OSI data link layer and other higher OSI layers for transmission line(s) 816 and 818. Duplex retimer 802 and receiver 202 and transmitter 204 can subsequently agree on a common, supported proprietary mode and configure their respective hardware/software to operate using the proprietary mode. It should be noted that proprietary modes can similarly be communicated between other remote LPs, such as another network device in FIG. 1, and receiver 202 and transmitter 204 and used between the two devices.

The proprietary speeds can be speeds that are higher than the standard speed in which the duplex retimer 802 and receiver 202 and transmitter 204 are specified as supporting for communicating the OSI data link layer and other higher OSI layers over transmission line(s) 816 and 818. For example, duplex retimer 802 and receiver 202 and transmitter 204 can be specified as supporting 50 Gb/s over a single lane in accordance with an IEEE 802.3 Standard specification. The proprietary speeds can be speeds above 50 Gb/s. The link training communication channel can be used to carry link training data that indicates the proprietary speeds that each of duplex retimer 802 and the pair of receiver 202 and transmitter 204 support for communicating the OSI data link layer and other higher OSI layers over transmission line(s) 816 and 818. The link training communication channel can further be used to carry link training data that indicates whether the channel over transmission line(s) 816 and/or 818 has characteristics that can support such proprietary speeds within some desired or required BER performance range.

The proprietary alignment markers can include alignment markers with different sizes, positioning, and content over those specified in a standard specification, such as one of the IEEE 802.3 Standard specifications. The proprietary FEC scheme can include the use of a proprietary generator matrix for encoding blocks of data or a proprietary polynomial for encoding blocks of data.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
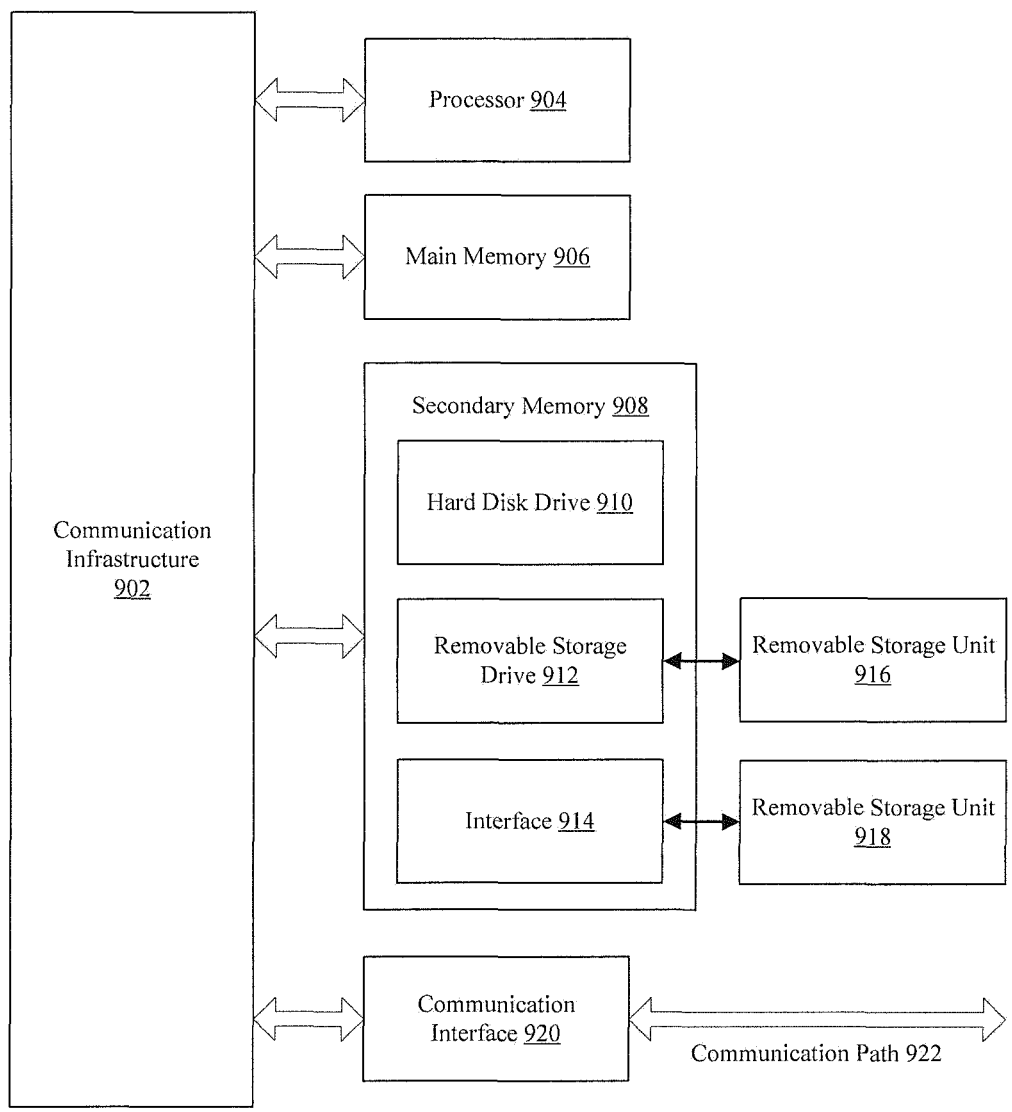
FIG. 9 illustrates a block diagram of an example computer system in accordance with embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. Blocks depicted in FIGS. 2-8 may execute on one or more computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A network device for performing serializer-deserializer communication with a remote link partner (LP) over a transmission line, the network device comprising:

a receiver comprising a decoder configured to extract link training data from a link training communication channel in a signal received from the remote LP over the transmission line, wherein the link training communication channel co-exists, on the transmission line, with data traffic corresponding to an Open Systems Interconnect (OSI) data link layer and other higher OSI layers in the signal; and a transmitter comprising a transmitter front-end, an encoder, and an adaptation parameter receiver configured to receive the link training data from the receiver and adjust one or more parameters of the transmitter front-end or the encoder based on the link training data, wherein the link training communication channel is formed using low-frequency signaling on top of the data traffic in the signal and with a frequency that is lower than high-frequency signaling used to transmit the data traffic in the signal.

2. The network device of claim 1, wherein the decoder comprises a low-pass filter configured to filter the signal to extract the link training data from the link training communication channel in the signal.

3. The network device of claim 1, wherein the data traffic appears as a differential mode component in the signal and the link training data appears as a common mode component in the signal.

4. The network device of claim 1, wherein the one or more parameters of the transmitter front-end or the encoder comprise equalizer tap weights.

5. The network device of claim 1, wherein the one or more parameters of the transmitter front-end or the encoder comprise precoder settings.

6. The network device of claim 1, wherein the one or more parameters of the transmitter front-end or the encoder comprise delay parameters to compensate for differential skew associated with the transmission line.

7. The network device of claim 1, wherein the network device is a switch.

8. A network device for performing serializer-deserializer communication with a remote link partner (LP) over a transmission line, the network device comprising:

a receiver configured to monitor a signal received from the remote LP over the transmission line to determine a change to one or more parameters of the remote LP; and a transmitter configured to transmit the change to the one or more parameters of the remote LP over a link training communication channel in a signal transmitted to the remote LP, wherein the link training communication channel co-exists, on the transmission line, with data traffic corresponding to an Open Systems Interconnect (OSI) data link layer and other higher OSI layers in the signal transmitted to the remote LP, wherein the link training communication channel is formed using low-frequency signaling on top of the data traffic in the signal and with a frequency that is lower than high-frequency signaling used to transmit the data traffic in the signal.

9. The network device of claim 8, wherein the transmitter comprises a digital-to-analog converter (DAC) for converting the combination of the low-frequency signaling and the high-frequency signaling from a digital domain to an analog domain.

10. The network device of claim 9, wherein part of a full-scale range of the DAC is reserved for the low-frequency signaling.

11. The network device of claim 8, wherein the one or more parameters of the remote LP comprise equalizer tap weights.

12. The network device of claim 8, wherein the one or more parameters of the remote LP comprise precoder settings.

13. The network device of claim 8, wherein the one or more parameters of the remote LP comprise delay parameters to compensate for differential skew associated with the transmission line.

14. A network device for performing serializer-deserializer communication with a remote link partner (LP) over a transmission line, the network device comprising:
- a receiver configured to extract link training data from a link training communication channel in a signal received from the remote LP over the transmission line; and
- a transmitter configured to receive the link training data from the receiver and adjust one or more parameters of the transmitter based on the link training data,
- wherein the link training communication channel co-exists, on the transmission line, with data traffic corresponding to an Open Systems Interconnect (OSI) data link layer and other higher OSI layers in the signal and is formed using low-frequency signaling on top of the data traffic in the signal with a frequency that is lower than high-frequency signaling used to transmit the data traffic in the signal.

15. The network device of claim 14, wherein the receiver comprises a low-pass filter configured to filter the signal to extract the link training data from the link training communication channel in the signal.

16. The network device of claim 14, wherein the data traffic appears as a differential mode component in the signal and the link training data appears as a common mode component in the signal.

17. The network device of claim 14, wherein the one or more parameters of the transmitter comprise equalizer tap weights.

18. The network device of claim 14, wherein the network device is a switch.

19. The network device of claim 14, wherein the one or more parameters of the transmitter comprise precoder settings.

20. The network device of claim 14, wherein the one or more parameters of the transmitter comprise delay parameters to compensate for differential skew associated with the transmission line.

* * * * *